UNITED STATES PATENT OFFICE.

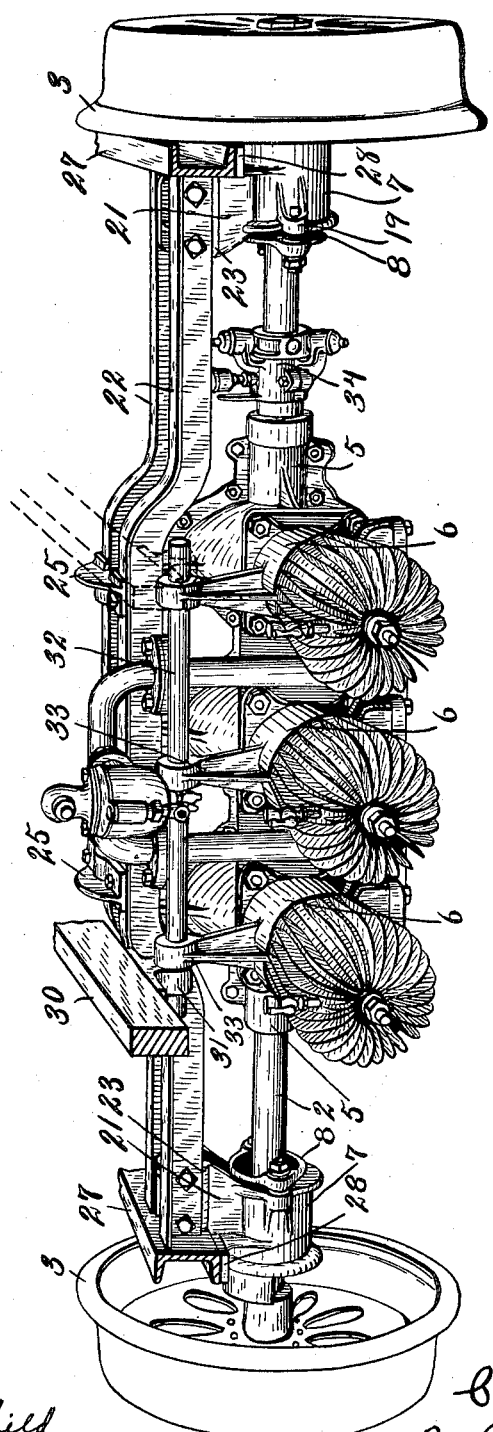

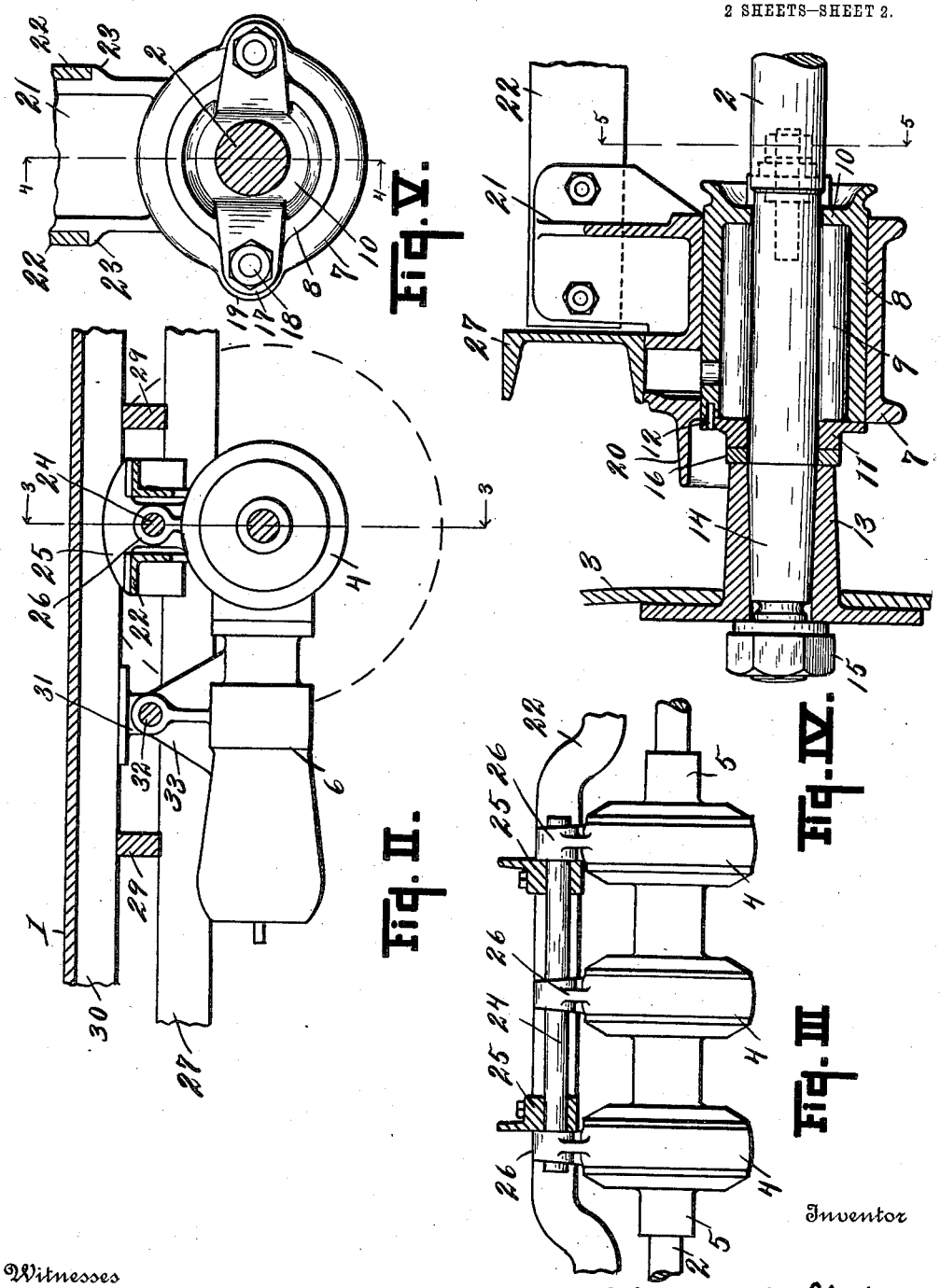

CHARLES B. STEBBINS, OF THREE RIVERS, MICHIGAN, ASSIGNOR TO SHEFFIELD CAR COMPANY, OF THREE RIVERS, MICHIGAN.

MOTOR-CAR.

1,032,633.  Specification of Letters Patent.  Patented July 16, 1912.

Application filed December 2, 1911. Serial No. 663,503.

*To all whom it may concern:*

Be it known that I, CHARLES B. STEBBINS, a citizen of the United States, residing at Three Rivers, county of St. Joseph, and State of Michigan, have invented certain new and useful Improvements in Motor-Cars, of which the following is a specification.

This invention relates to improvements in motor cars.

The main objects of this invention are, first, to provide in a motor car, an improved mounting for the engine; second, to provide an improved motor car in which the axle of the traction wheels is adapted as a crank shaft for the engine; third, to provide in a motor car in which the axle of the traction wheels is adapted as a crank shaft for the engine, an improved engine and axle support whereby springing of the axle is prevented and lateral thrust received upon members adapted to effectively withstand the same.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail perspective view of a structure embodying the features of my invention, the traction wheels only being shown, the greater portion of the body being omitted and details only of body sills being shown. Fig. II is a detail longitudinal section of a structure embodying the features of my invention, the body and engines being illustrated mainly in conventional form. Fig. III is a detail view partially in transverse vertical section taken on a line corresponding to line 3—3 of Fig. II, the parts being shown mainly in conventional form. Fig. IV is a detail view partially in vertical section taken on a line corresponding to line 4—4 of Fig. V, showing details of the axle boxes and the bearings. Fig. V is a detail view partially in section taken on a line corresponding to line 5—5 of Fig. IV.

In the drawing, similar reference characters refer to similar parts throughout the several views, and the sectional views are taken looking in the direction of the little arrows at the ends of the section lines.

Referring to the drawing, the car illustrated is of the flat or work car type, only such portions thereof being shown as are necessary to illustrate an embodiment of my invention.

The deck or body 1 may be of any suitable construction or design suitable for the purpose of the car. The structure illustrated is provided with three engines of the two cycle type. The axle 2 of the traction wheels 3 is adapted as a crank shaft for these engines. The engines are provided with crank casing 4 which are rigidly connected and provided with bearings 5 for the axle 2. The engine cylinders 6 and the crank casings 4 are rigidly connected. The axle 2 extends through the crank casings and is as stated, adapted as a crank shaft common to all of the engines. The axle boxes 7 are provided with bearing sleeves 8 for the bearing rollers 9. These bearing sleeves are provided with flanges 10 at their inner ends formed integrally with the sleeves and with roller retaining flanges 11 at their outer ends. The flanges 11 are secured against rotation as by means of pins 12. The traction wheels 3 are provided with tapered hubs 13 which receive the tapered portions 14 of the axles. The wheels are clamped upon these tapered portions of the axle by means of the nuts 15. Interposed between the inner ends of the hubs of the wheels and the bearing flanges 11 are washer-like thrust bearing members 16. The sleeves 8 are provided with laterally projecting ears 17 at their inner ends adapted to receive adjusting bolts 18 carried by ears 19 on the axle boxes 7. By these means, the sleeves can be adjusted to adjust the thrust members 16 and the thrust of the axle is sustained by the boxes. Guards 20 are provided for the outer ends of the sleeves 8.

The boxes 7 are provided with upwardly projecting pedestals 21 on which the truss members 22 are mounted, suitable seats 23 being provided for the members 22. The truss members 22 are arranged over the crank shaft, the central part of the truss members being preferably arched upwardly as shown. These truss members form a rigid connection for the boxes. A hanger rod 24 is supported between the members 22 by the brackets 25, the brackets 25 forming tie members for the members 22 as well as supports for the rod. The crank shaft casings are provided with hangers 26 through which the rod 24 is arranged, the hangers and the crank shaft casings also constituting tie members for the axle and truss members. The longitudinal sills 27 of the body 1 are mounted upon seats 28 provided therefor on the pedestals 21 of the axle boxes 7. The cross pieces 29 of the body rest upon the sills 27, the longitudinal pieces 30 resting in turn upon the cross pieces 29. On these longitudinal pieces 30 are supporting brackets 31 for the hanger rod 32. The cylinders 6 are provided with hangers 33 which slidably engage this rod 32, permitting lateral movement of the body and engines relative to each other. This movement is, under ordinary circumstances, slight, but is sufficient to allow for springing of the body or deck on account of load or from other causes.

It will be observed that the body is supported on the axle boxes entirely independent of the members 22 on which the engines are rigidly mounted and which members serve as a truss to prevent springing of the axle 2. This is a highly important feature where the axle is adapted as a crank shaft. Further, the thrust on the axle is taken through the boxes which are rigidly connected by the means described so that the engines move with the axle and there is no thrust strain on the engine cranks.

The structural details of the engines are not here described as they form no part of my present invention.

A timer device 34 is mounted on the axle, that is, the axle also serves as a timer shaft, but as the details of this timer device form no part of my present invention, I do not give a detailed description thereof herein.

I have illustrated and described my improvements in the preferred form in which I have up to this time, embodied them. I am aware however, that very great variation in structure is possible and I desire to be understood as claiming my improvements specifically in the form illustrated as well as broadly within the scope of the appended claims.

Having thus described my invention, what I claim as new and desire to secure by Letters Patent is:

1. In a motor car, the combination with a car body comprising longitudinal sills, of a plurality of engines comprising cylinders and crank casings, the crank casings being rigidly connected to the cylinders and to each other; traction wheels; an axle for said traction wheels arranged through said crank casings and adapted as a crank shaft for said engines, said crank casings being provided with bearings for said axle; axle boxes; longitudinally adjustable bearing sleeves arranged in said boxes; thrust bearing members between said adjustable sleeves and wheels; a pair of truss members mounted on said axle boxes, said truss members being offset upwardly above said engines, said boxes being provided with steps or seats for said truss members and said longitudinal body sills; a hanger rod arranged between said truss members; supporting brackets for said rod arranged between said truss members and constituting tie members therefor; hangers on said crank shaft casings engaging said rod, said crank casings and hangers constituting tie members between said axle and truss members; a hanger rod on said body; and hangers on said engine cylinders slidably mounted on said hanger rod on said body.

2. In a motor car, the combination with a car body, of a plurality of engines comprising cylinders and crank casings, the crank casings being rigidly connected to the cylinders and to each other; traction wheels; an axle for said traction wheels arranged through said crank casings and adapted as a crank shaft for said engines, said crank casings being provided with bearings for said axle; axle boxes, said body being mounted on said axle boxes; a pair of truss members mounted on said axle boxes; a hanger rod arranged between said truss members; supporting brackets for said rod arranged between said truss members and constituting tie members therefor; hangers on said crank shaft casings engaging said rod, said crank casings and hangers constituting tie members between said axle and truss members; a hanger rod on said body; and hangers on said engine cylinders slidably mounted on said hanger rod on said body.

3. In a motor car, the combination of a plurality of engines comprising cylinders and crank casings, the crank casings being rigidly connected to the cylinders and to each other; traction wheels; an axle for said traction wheels arranged through said crank casings and adapted as a crank shaft for said engines, said crank casings being provided with bearings for said axle; axle boxes; a pair of truss members mounted on said axle boxes; a hanger rod arranged between said truss members; supporting brackets for said rod arranged between said truss members and constituting tie members therefor; and hangers on said crank shaft casings engaging said rod, said crank casings and hangers constituting tie members between said axle and truss members.

4. In a motor car, the combination with a car body, of an engine comprising a cylinder and a crank casing; traction wheels; an axle for said traction wheels arranged through said crank casing and adapted as a crank shaft for said engine, said crank casing being provided with bearings for said axle; axle boxes, said body being mounted on said axle boxes; a pair of truss members mounted on said axle boxes above said axle; a hanger rod arranged between said truss members; supporting brackets for said rod arranged between said truss members; a hanger on said crank shaft casing engaging said rod; a hanger rod on said body; and a hanger on said engine cylinder slidably mounted on said hanger rod on said body.

5. In a motor car, the combination of an engine comprising a cylinder and a crank casing; traction wheels; an axle for said traction wheels arranged through said crank casing and adapted as a crank shaft for said engine, said crank casing being provided with bearings for said axle; axle boxes; a pair of truss members mounted on said axle boxes above said axle; a hanger rod arranged between said truss members; supporting brackets for said rod arranged between said truss members; and a hanger on said crank shaft casing engaging said rod.

6. In a motor car, the combination of a plurality of engines comprising cylinders and crank casings, the crank casings being rigidly connected to the cylinders and to each other; traction wheels; an axle for said traction wheels arranged through said crank casings and adapted as a crank shaft for said engines, said crank casings being provided with bearings for said axle; axle boxes, said body being mounted on said axle boxes; a truss member mounted on said axle boxes; and hangers on said crank shaft casings, said crank casings and hangers constituting tie members between said axle and truss member.

7. In a motor car, the combination of an engine comprising a crank casing; traction wheels; an axle for said traction wheels arranged through said crank casing and adapted as a crank shaft for said engine, said crank casing being provided with bearings for said axle; axle boxes; axle thrust bearing members supported by said boxes; a truss member mounted on said boxes; and a hanger on said crank shaft casing depending from said truss member, said hanger and crank shaft casing constituting a tie member for said axle and truss member.

8. In a motor car, the combination of an engine comprising a crank casing; traction wheels; an axle for said traction wheels arranged through said crank casing and adapted as a crank shaft for said engine, said crank casing being provided with bearings for said axle; axle boxes; a truss member mounted on said boxes; and a hanger on said crank shaft casing depending from said truss member, said hanger and crank shaft casing constituting a tie member for said axle and truss member.

9. In a motor car, the combination of an engine comprising a crank casing; traction wheels; an axle for said traction wheels arranged through said crank casing and adapted as a crank shaft for said engine, said crank casing being provided with bearings for said axle; axle boxes; a truss member mounted on said boxes; a hanger on said crank shaft casing depending from said truss member, said hanger and crank shaft casing constituting a tie member for said axle and truss member; a body mounted on said boxes; and a body hanger adapted to permit movement of said engine and body relative to each other.

10. In a motor car, the combination of an engine; traction wheels; an axle for said traction wheels adapted as a crank shaft for said engine; axle boxes; thrust bearing members for said axle supported by said boxes; and a truss member extending between said axle boxes, said engine being mounted on said truss member and body, the connection for said engine to said truss member being rigid, the connection for said engine to said body being adapted to permit movement of the engine and body relative to each other.

11. In a motor car, the combination of an engine; traction wheels; an axle for said traction wheels adapted as a crank shaft for said engine; axle boxes; thrust bearing members for said axle supported by said boxes; and a truss member extending between said axle boxes, said engine being rigidly connected to said truss member.

12. In a motor car, the combination of an engine; traction wheels; an axle for said traction wheels adapted as a crank shaft for said engine; axle boxes; a body mounted on said axle boxes; thrust bearing members for said axle supported by said boxes; and a truss member extending between said axle boxes, said engine being rigidly connected to said truss member.

13. In a motor car, the combination of an engine comprising a crank shaft casing; traction wheels; an axle for said traction wheels arranged through said crank casing and adapted as a crank shaft for said engine, said crank casing being provided with bearings for said axle; axle boxes; a member connecting said boxes, said crank shaft casing being rigidly connected to said member; longitudinally adjustable bearing sleeves arranged in said boxes; and thrust bearing members supported by said boxes.

14. In a motor car, the combination of an engine; traction wheels; an axle for said traction wheels adapted as a crank shaft for said engine; axle boxes; thrust bearing members for said axle, supported by said boxes; a body mounted on said axle boxes; and a connecting member for said axle boxes, said engine being rigidly connected to said member and being connected to said body to permit movement of the engine and body relative to each other.

15. In a motor car, the combination of an engine; traction wheels; an axle for said traction wheels adapted as a crank shaft for said engine; axle boxes; thrust bearing members for said axle, supported by said boxes; and a connecting member for said axle boxes, said engine being rigidly connected to said member.

16. In a motor car, the combination of an engine; traction wheels; a rigid axle for said traction wheels adapted as a crank shaft for said engine; axle boxes; a body mounted on said axle boxes; and a rigid engine supporting member mounted on said boxes, said engine being rigidly connected to said supporting member.

17. In a motor car, the combination of an engine; traction wheels; a rigid axle for said traction wheels adapted as a crank shaft for said engine; axle boxes; a body mounted on said axle boxes; thrust bearing members for said axle supported by said boxes; and a rigid axle truss member extending between said axle boxes, said engine being rigidly connected to said supporting member.

18. In a motor car, the combination of an engine; traction wheels; a rigid axle for said traction wheels adapted as a crank shaft for said engine; axle boxes; a body mounted on said axle boxes; a crank casing having bearings for said axle; and a supporting member to which said crank casing is connected, mounted on said axle boxes and extending between the same above the axle.

19. In a motor car, the combination of an engine; traction wheels; a rigid axle for said traction wheels adapted as a crank shaft for said engine; axle boxes; and a rigid supporting member for said engine mounted upon and extending between said axle boxes, said engine being rigidly connected to said supporting member.

20. In a motor car, the combination of an engine; traction wheels; a rigid axle for said traction wheels adapted as a crank shaft for said engine; axle boxes; a truss member extending between said axle boxes; a crank casing for said engine having bearings for said axle; and rigid connections for said casing to said truss member, said rigid connections and casing constituting tie members between said axle and truss member.

21. In a motor car, the combination of an engine; traction wheels; a rigid axle for said traction wheels adapted as a crank shaft for said engine; axle boxes; and a truss member extending between said axle boxes, said engine being rigidly connected to said truss member.

22. In a motor car, the combination of an engine; traction wheels; a rigid axle for said traction wheels adapted as a crank shaft for said engine; axle boxes; a truss member extending between said axle boxes, said engine being rigidly connected to said truss member, said connection being provided with bearing members engaging the axle adjacent to the engine.

23. In a motor car, the combination of an engine; traction wheels; a rigid axle for said traction wheels adapted as a crank shaft for said engine; axle boxes; a truss member extending between said axle boxes, there being a rigid connection for said engine to said truss member; and a tie connection between said axle and truss member whereby said axle is supported.

In witness whereof, I have hereunto set my hand and seal in the presence of two witnesses.

CHARLES B. STEBBINS. [L. S.]

Witnesses:
ARTHUR P. COTTLE,
ORLEY R. BAIRD.